United States Patent [19]

Rossin

[11] 4,364,030

[45] Dec. 14, 1982

[54] INTRUDER DETECTION SYSTEM

[76] Inventor: John A. Rossin, 1411 Norman Firestone Rd., Goleta, Calif. 93017

[21] Appl. No.: 73,869

[22] Filed: Sep. 10, 1979

[51] Int. Cl.³ ............................................. G08B 13/18
[52] U.S. Cl. .................................. 340/567; 250/340; 250/353; 340/555; 340/565
[58] Field of Search ............... 340/555, 556, 565, 567; 250/339, 340, 345, 353

[56] References Cited

U.S. PATENT DOCUMENTS

| | | | |
|---|---|---|---|
| 2,212,211 | 8/1940 | Pfund | 250/353 X |
| 3,026,413 | 3/1962 | Taylor | 250/339 |
| 3,524,180 | 8/1970 | Cruse | 340/567 X |
| 3,760,399 | 9/1973 | Schwarz | 340/567 |
| 3,839,640 | 10/1974 | Rossin | 250/353 |
| 3,923,382 | 12/1975 | Harding | 250/353 X |
| 3,928,849 | 12/1975 | Schwarz | 340/567 X |
| 3,958,118 | 5/1976 | Schwarz | 340/567 X |
| 4,052,716 | 10/1977 | Mortensen | 340/567 X |
| 4,081,680 | 3/1978 | Keller | 250/353 X |
| 4,179,691 | 12/1979 | Keller | 340/565 X |

*Primary Examiner*—John W. Caldwell, Sr.
*Assistant Examiner*—Joseph E. Nowicki
*Attorney, Agent, or Firm*—Spensley, Horn, Jubas & Lubitz

[57] ABSTRACT

The improved intruder detection system of the present invention, because of its sensor, optical, and electronic systems, is uniquely capable of responding only to radiation from an intruder to signal an alarm. To achieve this, the sensor and optical systems are designed and cooperate to optically reject and balance-out extraneous, nonintruder-related radiation. In addition, the electronic system detects and rejects nonintruder-related inputs by recognizing certain uniquely intruder-related characteristics of the sensor signals, and to only signal an alarm in response to inputs evidencing such characteristics. Preferably the system is designed to reliably sense the presence of an intruder in multiple zones, to be economical to manufacture, easy to install, to be battery-powered and of a long life.

11 Claims, 7 Drawing Figures

INTRUDER DETECTION SYSTEM

BACKGROUND OF INVENTION

1. Field of the Invention

The invention concerns an intruder detection system, particularly an improved system for detecting and signaling the presence of a human being within one or more defined areas.

2. Prior Art

Numerous systems have been designed and are presently in use to sense and signal the presence of an intruder within a defined area. Some such systems are active in nature, producing a signal within or to define the secure area, the signal being affected by the presence of an intruder and this affect being employed to actuate an alarm or other signal. Not only do such active systems require a continuous energy input, but their presence also can be deteced by the intruder, permitting them to be avoided or otherwise negated. Other intrusion detection devices are of a passive nature. Most passive systems detect the presence of an intruder in a defined area by sensing and responding to visible or invisible radiation of the intruder. Rossin U.S. Pat. No. 3,839,640, dated Oct. 1, 1974, presents an example of an intruder detection sensor responsive to infrared radiation.

Intrusion detection systems are subjected to a number of nonintruder-related inputs, all of which must be distinguished from an intruder related input if the system is to prove practical in use. Inputs which can cause false alarms included reflected sunlight such as from an airplane or automobile or light being directed onto the detector from automobile headlights or a flashlight out of the detection area. An intermittent electric heater, or flickering light bulb, or fluttering foliage or drape in the detector's field of view, also can actuate present systems, causing a false alarm. But the system must not just avoid false alarms, it must also detect the presence of an intruder, even when the intruder is taking steps to avoid detection, such as wearing white clothing while crossing a white background or while crossing a monitored background only after having adjusted his external temperature to closely approximate that of the background temperature. In short, detecting the presence of an intruder while not producing numerous false alarms presents a significant problem, one which has only been partially solved by previous intruder detection systems.

Many intruder detection systems are battery-powered. Often, such systems employ a circuit to detect battery voltage and to produce an alarm when that voltage drops below a certain level. This, too, results in a false alarm, since the alarm does not signal the presence of an intruder, but rather a drop in battery voltage below a given level.

3. Objectives

An object of the present invention is to provide an improved intruder sensor system uniquely designed and adapted to avoid producing an alarm signal in response to nonintruder related inputs, but to generate an alarm signal only in response to the presence of an intruder within a monitored area. Another object is to signal a drop in battery voltage below a given level, but not to produce a false alarm as a result of such a voltage drop. These and other objects will be apparent to those skilled in this field from the following detailed description of a preferred embodiment of the invention.

BRIEF SUMMARY OF THE INVENTION

The improved intruder detection system is designed to optically monitor an area and to produce an output or alarm signal only in response to the motion of an intruder across the monitored area. It includes a unique sensor, optical system, and electronic system, all of which are interrelated and cooperate to virtually eliminate false alarms.

The sensor electrically responds to infrared radiation from an intruder. It has at least two discrete sensing areas, each of which produces an electrical output in response to infrared radiation. Preferably, the sensor has a plurality of pairs of such sensing areas, each pair being capable of monitoring a different area for the presence of an intruder. Also, preferably the sensor is substantially transparent to visible radiation, and the sensing areas are defined by electrodes which also are substantially transparent to visible radiation.

The optical system includes means optically directing infrared radiation from only a monitored area onto the discrete sensing areas of the sensor, radiation from only a portion of the monitored area being directed onto each sensor area of a pair of sensor areas. Thus, movement of an intruder across the monitored area causes one then the other of the sensor areas to produce an electrical output.

Preferably, the optical means directs radiation from a plurality monitored areas onto the plurality of pairs of sensing areas in the manner just described, thereby monitoring the presence of an intruder in a plurality of different areas. Also, preferably the optical means includes means to filter visible radiation from the monitored area. Of course, since sunlight is so intense, relative to other radiations, even if 99% of all visible radiation is filtered from a flash of sunlight, still the magnitude of visible sunlight passing to the sensor will be appreciable. Thus, optical means preferably are provided for each pair of sensor areas to reflect visible light passing through one of the discrete sensing areas to and through the other sensing area of the pair. Accordingly, any output of one of the sensing areas resulting from such reflected sunlight or other visible light input is instantaneous compensated by a similar signal being produced in the other sensor of the sensor pair. Further, this arrangement allows extraneous inputs to be instantaneously detected and rejected, while still providing a system sensitive to intruder-related inputs.

The electronic system employed in the improved intruder detection system includes means for accepting and analyzing the electrical outputs of the sensor areas, the output or alarm signal being produced only in response to the occurrence of an electrical output first of one sensor area then of the other sensor area of the pair within a predetermined period of time. As a result, both the presence and motion of an intruder are detected by the system before an output or alarm signal is produced. The electronic system, to achieve this result, includes two discrete electrical channels responding respectively to the electronic signals of the discrete sensor areas, the channels each being responsive to the presence of such an electronic signal from one or more discrete sensor areas to produce an output only in response to an input above a given threshold level, their combined outputs being employed to trigger an alarm signal.

The electronic system preferably also includes means to adjust the sensitivity of at least one channel in response to the output of the other channel. This causes said one channel to produce an output in response to an input above a threshold level lower than said given threshold level. In other words, the sensitivity of each channel is increased in response to detection of radiation by other channel. By virtue of this increased sensitivity, an extraneous input simultaneously occuring on both channels and causing an output to be produced by one channel is sure to be detected by the other channels and rejected by the system.

As has been noted, preferably the sensor includes a plurality sensing area pairs. However, because of the design of the electronic means, only two channels need be provided, multiple pairs of elements being connected to these two channels, one element of each pair being connected to one channel and the other element of the pair being connected to the other channel of the system.

BRIEF DESCRIPTION OF THE DRAWINGS

The invention will be further described in connection with the accompanying drawings, in which.

DETAILED DESCRIPTION

As has been stated, because of certain elements and their interrelationship, the improved intruder detection system described herein is uniquely capable of sensing and detecting the presence of an intruder in a monitored area while avoiding false alarms from other inputs. In part, this result is achieved by certain features of the sensor and associated optical system; in part this result is achieved by certain features of the electronic system; in part this result is achieved by the synergistic cooperation of these elements. While these components and advantages will be described subsequently, it is the teachings presented herein to those skilled in this field, not their specific embodiment, that are inventive. Others may use such teachings in different environments to achieve similar or identical results. Accordingly, while a preferred embodiment of the invention is described, and while certain variations or modifications in the design and construction of this embodiment also are described, since other variations likely will occur to those skilled in this field the invention should not be thought of as limited in any way to such specific embodiments.

Figure 1:
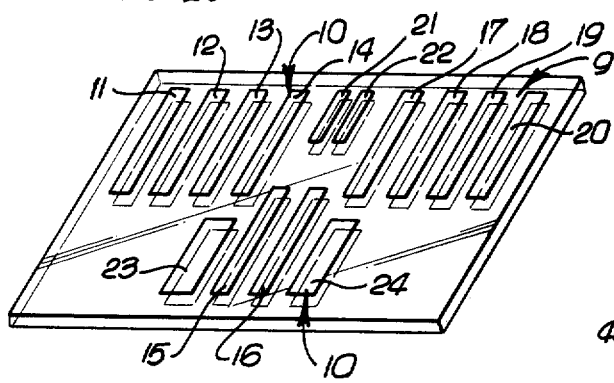
FIG. 1 is a perspective view of a preferred construction of the sensor.

The sensor 9 shown in FIG. 1 consists of a sheet of material responsive to infrared radiation, such as a pyroelectric plastic film of about 6 microns thickness. Typical pyroelectric materials include polyvinylidene flouride, lead zirconate titanate and lithium tantalate. Upon its front and back surfaces are deposited a plurality of electrode pairs 10A that are substantially transparent to radiation from the visible spectrum through long wavelength infrared radiation. While such electrode pairs may be achieved in any convenient fashion, in the preferred embodiment they are vacuum deposited as an indium tin dioxide coating on both sides of the film. Subsequently, certain portions of the sensor are masked in a conventional fashion, and the unmasked areas of indium etched away to result in a configuration of electrode pairs 10 on the film such as shown in FIG. 1. Each electrode forms a capacitor with the electrode facing it on the other side of the film. As is well-known in this art, when infrared energy impinges upon the pyroelectric plastic film in the area between or adjacent to an electrode, an electrical voltage is generated in the film by the pyroelectric phenomenon. This voltage results in a voltage difference appearing on the opposed electrode plates.

Preferably, a plurality of opposed electrode pairs are provided about the sensor, as shown, to permit monitoring of infrared radiation coming from various areas. For reference, particularly in connection with the schematic diagram of the electronic system, these electrodes have been consecutively numbered in FIG. 1 of the drawing from electrode number 11 through electrode number 24. Adjacent electrodes are optically-coupled in pairs, each to monitor a portion of a given area. Thus, as will be further described subsequently, electrode 11 of electrode pair 11-12 monitors one portion of a given area while electrode 12 monitors another, non-overlapping portion of that same area. Similarly, and as a further example, electrode 23 of electrode pair 23-24 monitors one portion of a different area while electrode 24 receives radiation from a different, preferably non-overlapping portion of that same area.

Figure 2:
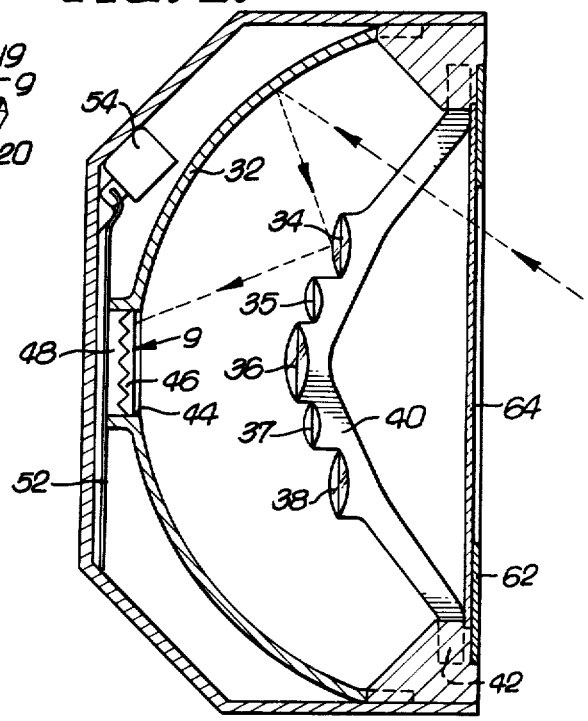
FIG. 2 is a view in cross-section of the optical system and its relationship to the sensor and other elements of the system.

The optical system is illustrated in cross section FIG. 2. It includes a primary or main collector mirror 32 and a plurality of secondary mirrors, five of which are shown, these being mirrors 34 through 38. The primary mirror preferably is spherical, and cut to provide only the surface required to direct radiation from the monitored areas onto the secondary mirrors. Thus, in a preferred embodiment it is a spherical surface having a diameter of about seven inches, and is cut to be just a few inches high, although it is much wider than that.

The secondary mirrors are mounted on a bar 40, the ends of which preferably are received in channels 42 provided in an extension of the spherical primary mirror element 32. By this arrangement, the primary and secondary mirrors of a Cassegrainian-type optical system are mechanically linked and interfitted with one another to accurately control and govern their spaced relationship. The secondary reflector may include a plurality of convex surfaces, or various different secondary mirror systems may be provided, which may be brought into the optical path of the system to reflect various different fields of view towards the infrared detector mounted at the center of the primary reflector. For example, different bars 40 and associated secondary mirror systems could be provided. Such an arrangement is particularly useful in an infrared sensor system employed to detect intrusion into a given area, for by use of such an adjustable or selectable convex secondary reflector, various fields of view can be directed onto the infrared detector. By appropriately forming, locating and adjusting the secondary reflector, it is possible to direct either a plurality of short diverse fields of view or a substantially continuous long field of view onto the detector, enabling the system easily to be adjusted for the intended application of the infrared detection device associated with the optical system. Also, it will be apparent to those skilled in the design of such systems that a variety of different embodiments could be employed, various of which would be preferred for different intended applications. The embodiment disclosed herein is preferred by the inventor for a particular set of applications. However, the invention should not be in any way limited to such a preferred embodiment, but rather concerns the principles and teachings herein set forth.

Figure 3:
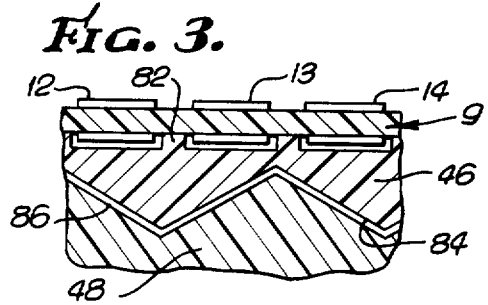
FIG. 3 is an enlarged cross-sectional view of a portion of the sensor and associated elements shown in FIG. 2.

An opening 44 is provided in the primary mirror 32. Within this opening is received and mounted sensor 9, a reflective backing element 46 and a mounting block 48, these three elements being received one on top of the other as shown in FIGS. 2 and 3. All of these elements, together with a printed circuit board 52 and a terminal bar 54, as well as a battery (not shown), are received in a case 56.

An aperture ring 62 and a protective window 64 are attached to the assembly, preferably by being fixed to the forwardly facing extension of the primary mirror 32 and to mounting bar 40, all as shown in FIG. 2. The aperture ring 62 prevents all radiation except that passing through its central opening from striking the optical system and thereby defines the primary aperture of the optical system. The protective window 64 preferably reflects substantially all visible radiation and permits only infrared radiation to pass through the primary and secondary mirrors to the sensor. One excellent reflector of visible radiation is germanium. A layer of this material may be deposited on an element overlying sensor 9, thereby reflecting or absorbing 60 to 90% of all impinging radiation up to about 1.8 microns in wave-length. The cast plastic block 46 absorbs most if not all radiation longer than about 2.1 microns.

As a result of this structure, a band of radiation from 1.8 to 2.1 microns that has passed through one sensor of a pair is reflected by backing element 46 through the other sensor of the pair. Thus, such radiation will automatically and instantaneously be detected by both sensors of the pair. As will be described in further detail subsequently, this band of radiation is employed to inhibit response of the system to such an input. Since radiation in this band is characteristic of extraneous, non-intruder related occurences, it is an excellent indicator of such inputs. Put differently, the infrared radiation of an intruder peaks at about 10 microns; visible radiation from an intruder (such as reflection from a white shirt) is not appreciable in the 1.8-2.1 micron band, having peaked at far shorter wavelengths. However, reflected sunlight, automobile headlights and other nonintruder related inputs have substantial energy in the 1.8-2.1 micron band. Employing energy in this band as a uniquely identifying characteristic of such non-intruder related events is an important feature of the present invention. As will be shown, it permits a virtually instantaneous rejection of such inputs while maintaining sensitivity of the system to intruder related radiation. This important ability in large measure permits the present detector to be used outside, as well as inside.

Figure 4B:
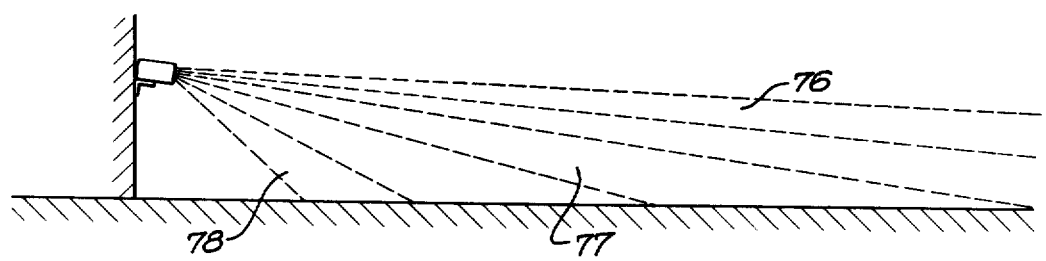
FIGS. 4A and 4B are views showing the detector mounted to monitor certain defined areas.
Figure 4A:
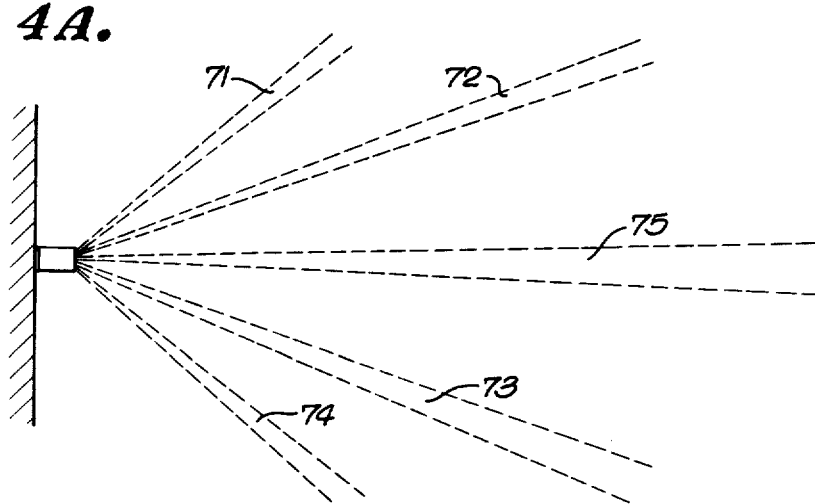

Preferably the sensor system is mounted to monitor a plurality of different discrete areas. The primary and secondary mirrors direct radiation from certain discrete fields of view onto the various sensor areas. As an intruder crosses a given field of view, infrared radiation generated by his body will strike first one sensor area, then the other sensor area of the pair viewing that field. More specifically, as shown in FIGS. 4A and 4B, the optical system may be designed to reflect radiation from area 71 onto sensor pair 11-12, from area 72 onto sensor pair 13-14, from area 73 onto sensor pair 17-18, and from area 74 onto sensor pair 19-20. As has been explained, by virtue of the design of the optical system infrared radiation from only a portion of the monitoring area, such as the left half of area 71, is directed onto one of the sensors of a sensor pair, such as on sensor 11 of sensor pair 11-12, while radiation from substantially the other half of the monitored area is directed onto the other one of the sensor pair. These halves preferably do not overlap, but are spaced slightly. Thus, motion of an intruder across monitored area 71 will result in infrared radiation first striking sensor area 11, then sensor area 12, each sensor area in turn producing a voltage output across its opposed electrode plates.

In addition to monitoring multiple areas at an angle from the main axis of the sensor, it is also desired to monitor multiple areas along the main longitudinal axis of the sensor. These main areas are indicated, in FIG. 4B, by reference character 75, and shown in cross-section in FIG. 4A. They include a monitored area 76, radiation from which is directed onto electrode pair 15-16, radiation from a monitor area 77 being directed onto electrode pair 21-22 and radiation from a monitored area 78 being directed onto electrode pair 23-24.

By virtue of the design of the sensor element and optical system, sensor pair 11-12 and similar sensors will be effected to detect infrared radiation up through 50 feet. The somewhat smaller sensor pair 21-22, however is employed to detect radiation out to about 100 feet, i.e. that in area 76, since the image from that distance will also be smaller. Sensor pair 15-16 is employed to monitor radiation from somewhat closer area 77, whereas sensor pair 23-24 preferably monitors radiation from a close but broad area 78, thereby sensing the presence of an intruder attempting to slip under and past the detector. By virtue of this monitoring of infrared radiation from a number of separate fields, the presence of an intruder in the general area being viewed by the detector system is highly likely to be sensed.

Preferably the optical system is designed so that the upper limit of zones 71-74 and 76 are all in substantially the same place. Accordingly, it is possible to mount the sensor in an inverted manner to that illustrated, and close to the ground, this plane being generally parallel to the ground but sufficiently high to avoid detecting the presence of small animals.

As has been stated, the secondary reflector consists of a plurality of convex reflective surfaces which are positioned between the primary reflector and its focal point to intercept infrared radiation reflected by the primary reflector. Positioning this secondary reflector between the primary reflector and its focal point is important because it too, significantly contributes to a small-size detector, and also permits the sensor to be mounted in an opening, of or behind, the primary mirror. Further, this optical arrangement directs radiation onto the sensor in a substantially perpendicular manner thereby minimizing specular reflection. Thus, by such a simple arrangement of components, a highly useful, improved optical system for an infrared detector is achieved. Instead of using spherical or other shape continuous surface optical elements, of course Fresnel elements could be employed if desired. They would significantly further reduce the size of the detector, and may be preferred for that reason in some applications.

It is possible to disable any portion of the sensor system in a simple, inexpensive manner simply by providing a hood (not shown) with transparent and opaque regions, the hood being designed to fit over case 56 and to cover the protective window 64, the opaque regions on the hood being designed to correspond to the optical regions of the monitored area that are desired to be blocked.

A reflective backing member 46 is provided behind sensor 9 as shown in FIG. 3. This reflective backing element preferably consists of a material that is substantially transparent to visible radiation but opaque to infrared radiation, such as an acrylic plastic. One face is designed to lie adjacent the sensor, this face having projecting feet 82 which bear on the sensor surface between adjacent conductive areas or electrode plates. The other surface of the reflective backing element includes faces 84 upon which are deposited a coating 86 reflective to visible radiation and to radiation up to at least 2.1 microns in wavelength. Faces 84 preferably are angled relative to one another to direct such radiation passing through sensor area 12 to sensor area 13. Accordingly, should a flash of reflected sunlight strike the sensor, the small portion which will pass to the sensor area 12 will be reflected back through sensor area 13 and thereby simultaneously affect both sensors. Of course, this portion of such reflected sunlight striking area 13 will similarly be reflected back to area 12, ensuring a simultaneous response of both sensors to such radiation.

Figure 5:
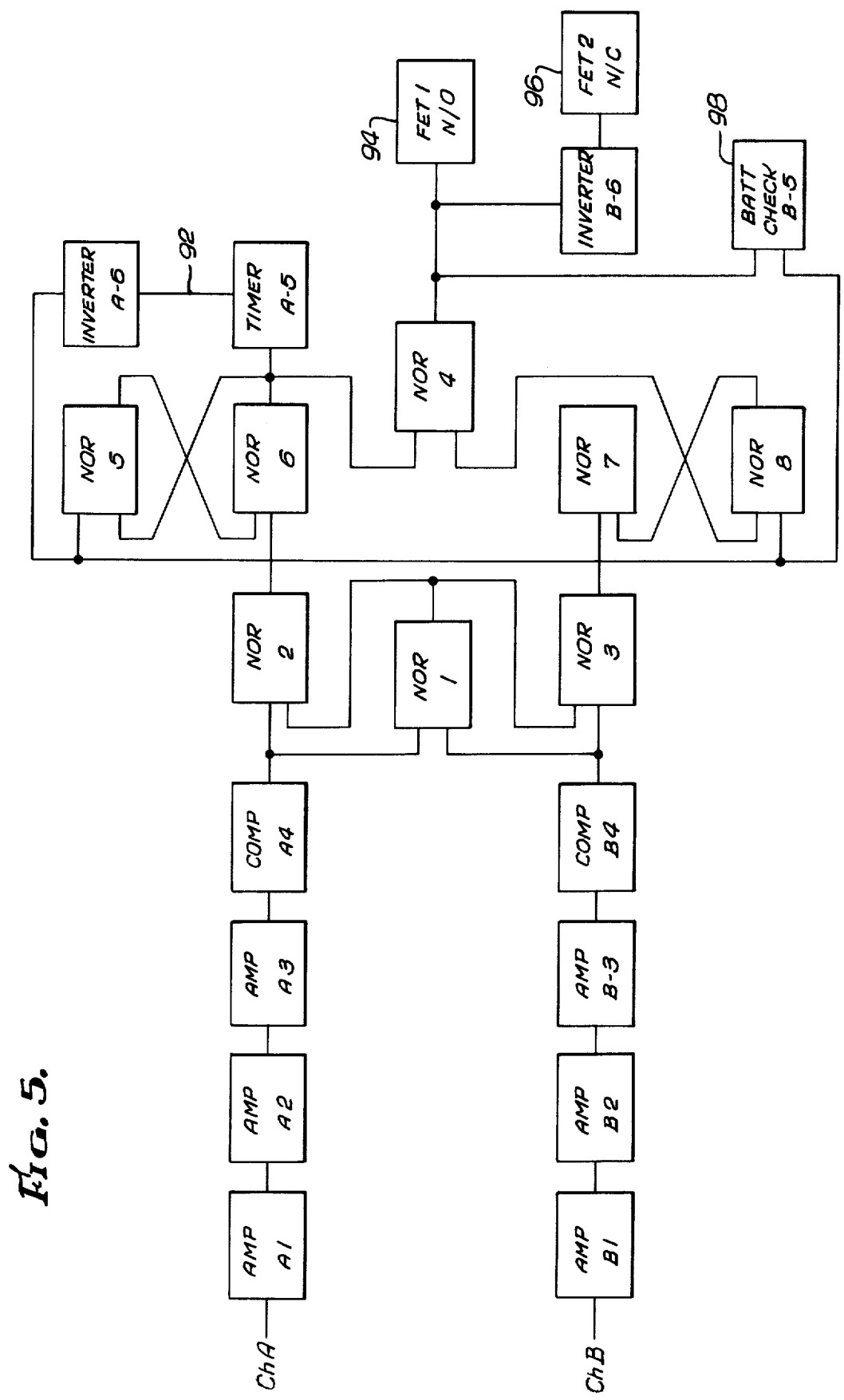
FIG. 5 is a block diagram of a preferred electronic system employed with the system.

The electronic system employed in the sensor will not produce an alarm signal in response to such a simultaneous voltage signal occurring on sensor pairs 12 and 13, or any other sensor pair. The system, and this ability, now will be described in connection with FIGS. 5 and 6.

As has been noted, radiation from each monitored area is directed onto one of a pair of sensors. One of this pair may be thought of as the "A" element or area of the pair, the other element may be thought of as the "B" element of the air. The output from any of the "A" elements of the sensor pairs, and preferably from all "A" sensor elements, is applied to amplifier A1 shown in FIG. 5, while the electrical output from the corresponding "B" elements of such pairs is applied to the amplifier B1 shown in FIG. 5. Thus, should infrared radiation strike any of the "A" elements, the resulting electrical voltage will be amplified through amplifiers A1, A2 and A3 and is applied to comparator A4. If it is found to exceed a certain minimum value sufficient to isolate the normal noise and extraneous inputs from an intruder related input, the comparator will produce a specific digital or logic output. Similarly, if the input from any of the "B" elements to the "B" amplifier chain exceeds some minimum value, comparator B4 also will produce a specific digital or logic output. The normal or quiescent logic output of both comparators is a three-volt, or binary "one", signal. Should a sufficient input be applied to either of the comparators, this logic output changes from a three-volt binary 'one' signal to a zero volt, binary 'zero' signal.

Figure 6:
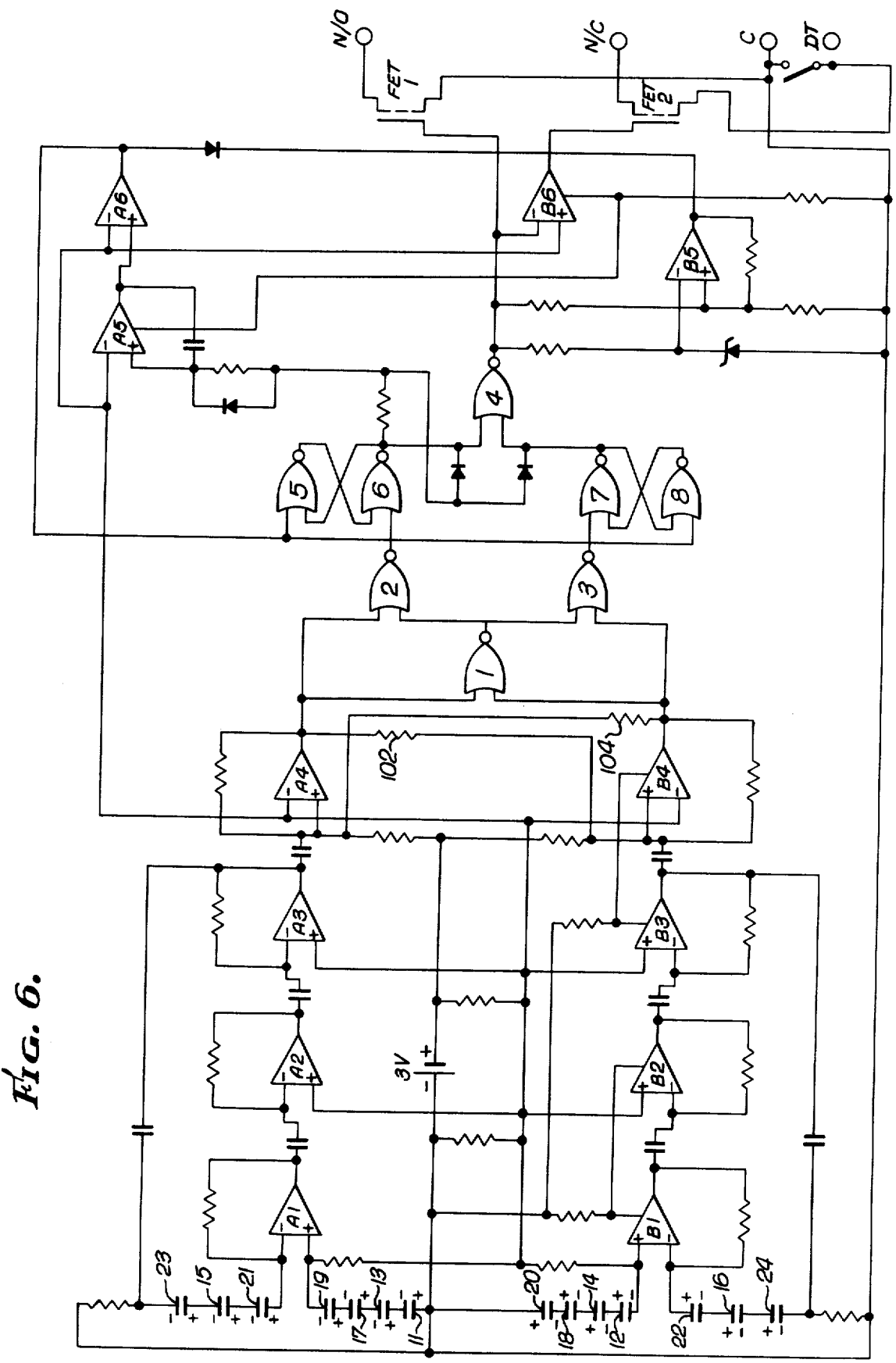
FIG. 6 is a schematic diagram of the preferred electronic system.

The pyroelectric film preferably responds very quickly to infrared energy. Since the sensor elements are capacitor plates, and are coupled in chains, as shown in FIG. 6, it is only a change in potential that is applied to the amplifier chains, and to which they respond. In other words, it is not the presence of an intruder in a field of view, but rather his entering or leaving that field to which the system responds.

Should both comparator outputs change substantially simultaneously, as would happen if a sunlight flash struck the sensor array, the two outputs of comparators A4 and B4 would both change from a binary one to a binary zero, resulting in the output of NOR gate 1 changing from zero to one. Should this happen, the output of both NOR gate 2 and NOR gate 3 would be inhibited. In this fashion the system instantaneously responds to, and blocks, extraneous inputs. After such an input has occurred, the system immediately returns to its normal state, one in which it is highly sensitive to intruder-related infrared radiation. When such an intruder is sensed, since his motion across the monitored area will be finite, the output of one of the comparators will drop to zero for a moment and then, somewhat later, the output of the other comparator will drop to zero.

Assume the output of comparator A4 first drops to zero. Since the inputs to NOR gate 1 will be zero and one, its output will be a zero and both outputs to NOR gate 2 will therefore be zero resulting in a binary one output of NOR gate 2. This output in turn is applied to a latch circuit consisting of NOR gates 5 and 6, causing the output of NOR gate 6 to change from one to zero and to be held at zero. This output is applied to timer A5 which in turn, for a predetermined period such as five seconds, produces an output on line 92. This output is inverted by inverter A6 and applied to NOR gate 5 thereby holding the binary zero as the output of NOR gate 6 for this predetermined period. At the conclusion of the predetermined period, however, the output of timer A5 will change from zero to one thereby unlatching NOR circuits 5 and 6 and causing the output of NOR gate 6 to return to binary one. Accordingly, a nonmoving infrared input, or a slowly moving input (such as a cloud), will not result in an alarm signal. Only an infrared input which moves across the fields of view within five seconds will result in a combination of events that will produce an alarm signal, as described.

If while timer A5 is actuated and comparator A4 has returned to its quiescent, binary one state, should comparator B4 produce an output signaling the presence of an intruder in the area being viewed by one of the "B" sensors, its resulting binary zero output will trigger NOR gate 3 causing it to produce a binary one. This in turn latches NOR gates 7 and 8 and causes the output of NOR gate 7 to be a binary zero. If this has occurred within the predetermined five second period after actuation of NOR gate 6, as measured by timer A5, both outputs to NOR gate 4 will be a zero causing it to produce a binary one output. This output is the alarm signal. It is applied to a normally open FET switch 94 and through inverter B6 to a normally closed FET switch 96. These FET switches may actuate or control any appropriate alarm device, such as an automatic telephone dialing system or a control panel.

The electronic system also includes a battery test circuit 98. Should NOR gate 4 produce a binary one output and should the voltage of the battery powering the system drop beneath a certain given level, battery test circuit 98 reponds to these two conditions and produces an output. It is applied to NOR gates 5, 6, 7 and 8 to hold them in a latched state, thereby preventing the alarm signal applied by NOR gate 4 to FET switches 94 and 96 from dropping to a quiescent state until the battery has been replaced with one of sufficient voltage. Of course, normally the alarm connected to the detector system is disabled for a period each day during which there is normal activity in the monitored area. The detection system will still respond to this activity, however. Should the battery voltage be low, NOR gate 4 will be triggered by such activity and will continue to produce an alarm output, as noted. When the alarm thereafter is enabled at the end of that period of activity in the monitored area, it will be found that the alarm is activated and can not be disabled. Accordingly, the user or security company then will know that a low voltage battery condition exists, and can replace the battery. Should such a condition develop while the detector system is monitoring an area, it will not be signaled until an intruder is detected. In this fashion, a low voltage condition of the system will be signaled only after the presence of a person in the monitored area is detected. In other words, false alarms are avoided by this battery test circuit. However, the low battery voltage alarm will happen very seldom since the anticipated life of the battery in the preferred system is on the order of 20 years.

A schematic of the electrical system is shown in FIG. 6. Similar reference characters have been used to designate similar elements. Of course, the various components are mounted on printed circuit board 52. It is believed that the operation of this system will be apparent to those skilled in this field from the foregoing description of the block diagram of the system. However, it should be noted that the system incorporates two resistors, resistors 102 and 104, which interconnect comparators A4 and B4. Each of these resistors provides a feedback to augment the input to the other comparator, thereby reducing the effective signal level from its associated amplifier A3 or B3 required to actuate the comparator.

Assume that a weak, but non-intruder related, input strikes the detector, an input just sufficient to trip, say, comparator A4. This optical input will be partially absorbed in element 46, and partially reflected back through the adjacent "B" electrode of the pair. When comparator A4 tripped, it dynamically and momentarily reduced the "B" input required to trip comparator B4. Thus, the reflected input to the "B" electrode, though reduced, still will be sufficient to trip comparator B4. These two comparators, responding virtually simultaneously to the same input, activate NOR gate 1 thereby inhibiting further response of the system to this low level, non-intruder related input. Accordingly, should simultaneous inputs occur on both channels and one of the comparators produce a corresponding output signal, the input to the other comparator required to cause it to produce an output signal is adjusted to render its channel more sensitive, thereby ensuring inhibition of the alarm signal by the system even though the signal level applied to one comparator might be less than that applied to the other comparator.

As has been noted, variations in the preferred embodiment of the improved intruder detection system may be made while still employing the teachings herein set forth and achieving the advantages of this system. Accordingly, the scope of the invention is set forth in the following claims.

I claim:

1. An improved detection system for optically monitoring an area an producing an alarm signal only in response to motion of an intruder across the monitoring area, including:
   (a) A sensor optically responsive to infrared radiation of an intruder, the sensor having at least a pair of discrete sensor areas each producing an electrical output in response to infrared radiation;
   (b) Means optically directing infrared radiation from only the monitored area onto the discrete sensor areas of the sensor, radiation from only a portion of the monitored area being directed onto each sensor area, whereby movement of an intruder across the monitored area causes one then the other of the sensor areas of the pair to produce an electrical output;
   (c) Electronic means accepting and analyzing the electrical outputs of the sensor areas and producing said alarm signal in response to the occurence of an electrical output of one sensor area then of the other sensor area of a pair within a predetermined period of time, the electronic means including
      (i) at least two separate electronic channels responding respectively to the electrical output of the discrete sensor areas of the pair, the channels each being responsive to the presence of the electrical output of a discrete sensor area to produce an output in response to said electrical output above a given threshold level,
      (ii) means automatically adjusting the sensitivity of at least one channel in response to the output of the other channel to cause said one channel to produce an output in response to an input above a threshold level lower than said given threshold level, and
      (iii) means analyzing the outputs of the electronic channels and producing an alarm signal in response to the occurrence of said channel outputs within a predetermined period of time.

2. An improved intruder detector system as set forth in claim 1 including optical means to filter substantially all noninfrared radiation from the radiation directed onto the sensor and to direct substantially only infrared radiation from the monitored area onto the sensor.

3. An improved intruder detection system as set forth in claim 1 in which the sensor is substantially transparent to a predetermined band of radiation which includes visible light, and includes electrode areas defining said discrete sensor areas, the electrode areas also being substantially transparent to said predetermined band of radiation, the system including optical means to reflect said predetermined band of radiation passing through one sensor area and its associated electrode to another sensor area and its associated electrode, whereby the signal resulting from said predetermined band of radiation input to one sensor area may be cancelled by the signal resulting from reflected radiation in said predetermined band through another sensor area.

4. An improved intruder detection system as set forth in claim 3 in which the system also includes means to prevent infrared radiation passing through one sensor area from being reflected onto another sensor area.

5. An improved intruder detection system as set forth in claim 4 in which the optical means to reflect radiation in said predetermined band from one sensor area to another includes reflectors disposed on a block of material positioned between the sensor and the reflector, the material being selected to absorb infrared radiation, the block thereby substantially preventing radiation passing through one sensor area from being reflected to another sensor area.

6. An improved optical system as set forth in claim 5 in which said analyzing means includes means to sense the substantially simultaneous output of both channels and inhibit said alarm signal, and in which the electronic means is powered by an applied voltage and includes means to sense the voltage, and if the voltage is beneath a predetermined value, to cause said alarm signal to continue to be produced only if it has first been triggered by the presence of an intruder, and in which the optical means includes a concave primary reflector for reflecting infrared radiation from a field of view towards a focal point, the primary reflector having an opening substantially centrally located in its surface,
  a secondary concave reflector, and
  means mounting the secondary reflector between the primary reflector and its focal point to cause the secondary reflector to direct infrared radiation reflected by the primary reflector generally towards the opening in the primary reflector, the sensor being positioned substantially in the opening in the primary reflector.

7. An improved intruder detection system as set forth in claim 1 in which said analyzing means includes means to sense the substantially simultaneous output of both channels and inhibit said alarm signal.

8. An improved intruder detection system as set forth in claim 1 in which the sensor includes a plurality of discrete sensing area pairs, and in which the means for optically directing infrared radiation onto the sensor directs radiation onto different sensor pairs from different monitored areas.

9. An improved intruder detection system as set forth in claim 1 in which the electronic means is powered by an applied voltage and includes means to sense the voltage, and if the voltage is beneath a predetermined value, to cause said alarm signal to continue to be produced only if it has first been triggered by the presence of an intruder.

10. An improved intruder detection system as set forth in claim 1 in which the optical means includes a concave primary reflector for reflecting infrared radiation from a field of view towards a focal point, the primary reflector having an opening substantially centrally located in its surface,
  a secondary convex reflector, and
  means mounting the secondary reflector between the primary reflector and its focal point to cause the secondary reflector to direct infrared radiation reflected by the primary reflector generally towards the opening in the primary reflector, the sensor being positioned substantially in the opening in the primary reflector.

11. An improved optical system as set forth in claim 10 in which the mounting means removably mounts the secondary reflector.

* * * * *